Nov. 1, 1966  E. L. SLOVER ET AL  3,282,217
AUTOMATIC CONTROL FOR PUMPING LIQUID
Filed Sept. 30, 1963  2 Sheets-Sheet 2

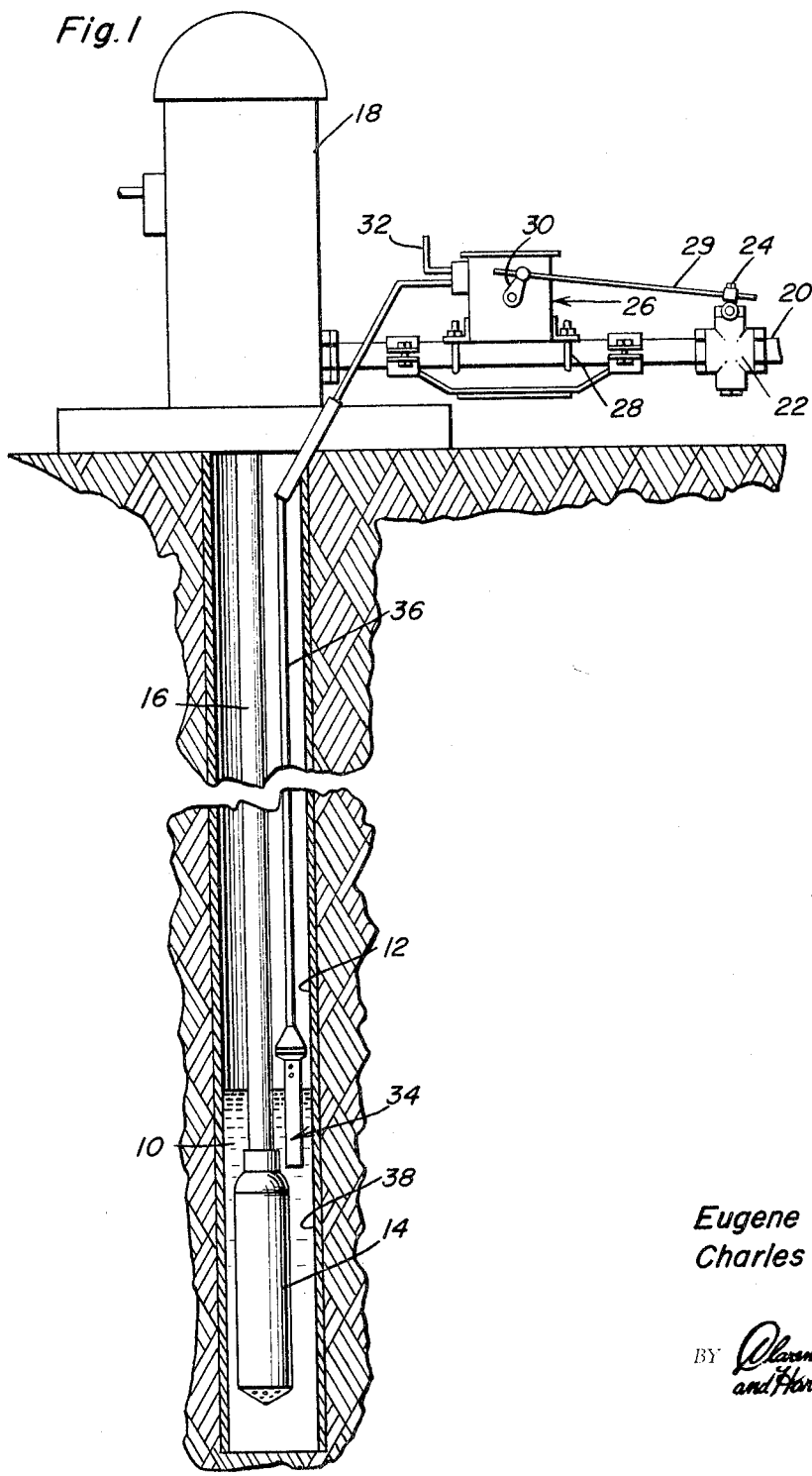

Eugene L. Slover
Charles E. Bruton
INVENTORS

BY Clarence A. O'Brien
and Harvey B. Jacobson
Attorneys

United States Patent Office 3,282,217
Patented Nov. 1, 1966

3,282,217
AUTOMATIC CONTROL FOR PUMPING LIQUID
Eugene L. Slover, 1409 S. 2nd, and Charles E. Bruton,
Box 295, both of Lamesa, Tex.
Filed Sept. 30, 1963, Ser. No. 312,584
3 Claims. (Cl. 103—11)

This invention relates to a system for controlling the discharge flow of liquid being pumped from a source receiving liquid at an inflow rate that is variable and/or uncontrolled. More particularly, the present invention is related to an automatic control system for maintaining a preset level of liquid such as water within an irrigation well so as to prevent the well from being pumped dry with resultant damage to the pump and associated equipment.

It is therefore a primary object of the present invention to provide a liquid discharge modulating control system by means of which the discharge flow from a pump may be regulated in accordance with or in proportion to a variable inflow rate of liquid to the source from which the liquid is being pumped.

Another object of the present invention is to provide a new and useful liquid level sensing device operative to instantaneously dispatch signals in response to variation in the liquid level so that the discharge rate of liquid being withdrawn from the source may be varied accordingly so as to restore the preset liquid level and maintain it constant.

A still further object of the present invention in accordance with the foregoing object, is to provide a servo-control mechanism for positioning a choke valve controlling the continuous discharge from a pumping mechanism in response to liquid level changing signals. The servo-motor mechanism is based on a null-voltage principle, with the null-voltage condition being disturbed by command signals from the liquid level sensing probe. A servo-motor is thereby directionally energized for changing the position of the choke valve, the position of the choke valve being reproduced by movement of a balancing potentiometer operative through a balancing relay to deenergize the servo-motor when the choke valve position and discharge flow rate corresponding thereto restores the liquid level.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a more or less diagrammatic view showing a typical installation of the pumping control system of the present invention.

FIGURE 2 is a partial perspective view with parts broken away and shown in section of the probe element.

Figure 3:
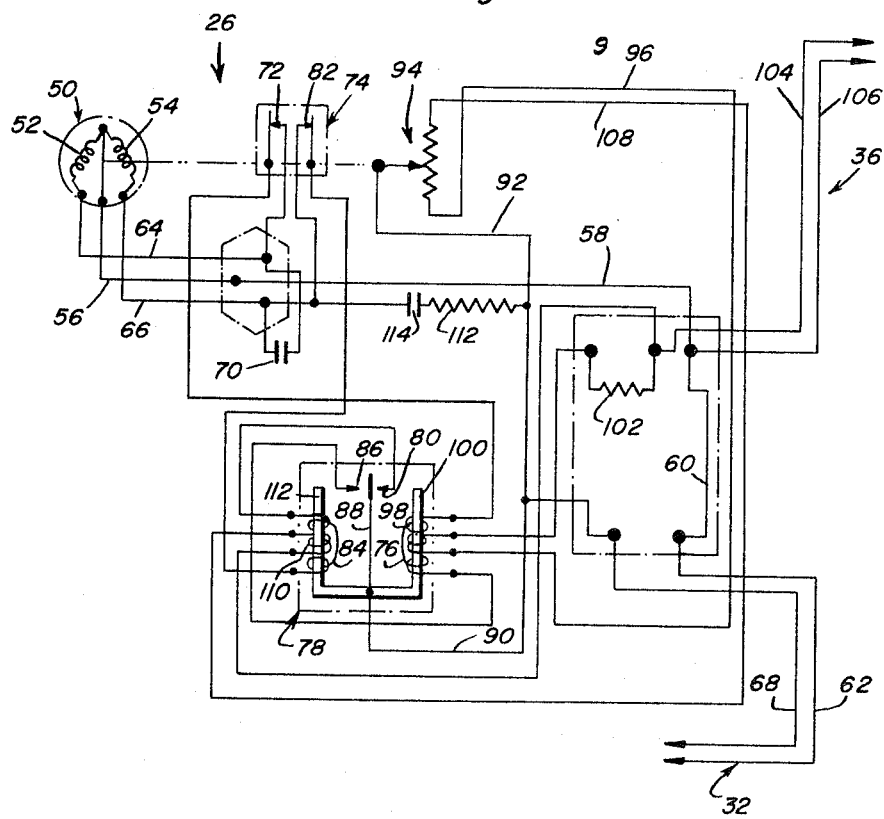
FIGURE 3 is an electrical circuit diagram corresponding to the system of the present invention.

Referring now to the drawings in detail, it will be observed that the system of the present invention is associated with a reservoir or source of water 10 constituting an irrigation well formed by the well casing 12 vertically sunk into the ground. Accordingly, a pumping mechanism is associated with the well including an impeller component 14 disposed within the water 10 and mounted at the lower end of an impeller shaft and suction tube housing 16 which extends downwardly from the pumping mechanism 18 located thereabove so that it may be displaced by the impeller head 14 upwardly through the housing 16 and discharged into some container or water distributor through the discharge conduit 20. Discharge flow of water is therefore regulated by means of a choke valve assembly 22 of known construction. The discharge rate will therefore depend upon the position of the valve crank 24 associated with the choke valve asembly 22. A servo-control unit 26 is therefore mounted on the discharge conduit by means of U-bolts 28 and is connected to the valve crank 24 by the connecting rod 29. The connecting rod 29 will therefore controllably position the valve crank and is driven by a motor output crank 30 associated with the unit 26. Electrical energy for operating the unit 26 is obtained by connection of the electrical cable 32 to an electrical source of energy. Also, command signals for operating the servo-unit 26 is derived from a level sensing probe generally referred to by reference numeral 34 which is connected to the unit 26 by means of a waterproof electrical cable 36.

Figure 4:
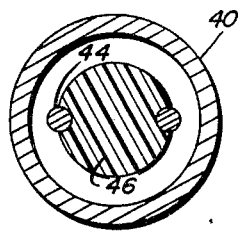
FIGURE 4 is a transverse sectional view taken substantially through a plane indicated by section line 4—4 in FIGURE 2.

The probe element 34 is immersed within the water 10 to a predetermined depth and is spaced above the impeller head 14 within the lower perforated pipe section 38 of the well casing 12 as shown in FIGURE 1. With continued reference to FIGURES 2 and 4, it will be observed that the probe element is enclosed within a tubular shield 40 made of non-conductive material. The tubular shield is open at the bottom so as to permit water to retain the same level within the tube as within the well casing The upper end of the shield is however sealed by the portion 42 to the waterproof cable 36 through which a pair of electrical conductors extend. The electrical conductors are connected to a pair of sensing electrodes 44 made of a non-corrosive metal such as stainless steel, monel metal, chromonel, etc. The electrode elements are mounted on and spaced by an elongated spacer made of non-conductive material such as plastic. It will therefore be apparent, that the water or other liquid within which the probe element 34 is immersed, will establish an electrically conductive path between the electrodes 44 with which it is in contact. The depth to which the electrodes are immersed in the liquid will therefore determine the effective resistance established therebetween by the conductive path. In this manner, the probe element will reflect the level of liquid inasmuch as changes in the liquid level correspondingly change the resistance of the conductive path between the electrodes. In order to accurately reflect the liquid level, the electrodes are housed within the tubular shield 40 so as to avoid contact of falling water therewith. Also, the tubular housing is provided with vent holes 48 disposed above the liquid level inasmuch as the upper end of the tubular shield is sealed. Thus, the control system is adjusted by adjustably mounting the probe element 34 so that it is immersed to a predetermined depth in the liquid or water, this depth depending upon the conductivity of the liquid, the desired liquid level to be maintained constant, the particular choke valve with which the system is associated and the pumping mechanism.

Referring now to FIGURE 3 in particular, it will be observed that the servo-unit 26 is provided with a reversible motor 50, the armature of which is connected to the output crank 30 by means of which the choke valve 22 is repositioned upon energization of the motor in one direction or the other. Accordingly, the motor is provided with a pair of field coils 52 and 54 connected in common to the conductor 56 which in turn is connected by the conductors 58 and 60 to one of the power lines 62 associated with the power cable 32 from which electrical energy is derived. Accordingly, the motor 50 will be energized for displacement of the output crank 30 in one direction or the other depending upon which of the coils 52 and 54 is energized. The coils 52 and 54 are therefore respectively connected to conductors 64 and 66 through which energizing circuits may be completed when either conductor 64 or conductor 66 is electrically connected to the other power line 68. Also, connected across the power lines 64 and 66 is a capacitor 70 to render the motor operative as a capacitive start motor. Conductor 64 may therefore be electrically connected through the normally closed switch 72 of the limit switch assembly 74 in series with an electromagnetic coil 76 of a balancing relay device 78 to the fixed relay switch contactor 80. Similarly, the conductor 66 connected to the motor is connected through the normally closed switch 82 of the limit limit switch assembly in series with the coil 84 to the other fixed contact 86 associated with the balancing relay device. The movable relay contactor 88 will therefore either engage the fixed contact 80 or the fixed contact 86 so as to complete an energizing circuit through one of the coils of the motor 50 in series with one of the electromagnet coils 76 and 84 of the balancing relay device.

The power line 68 is also connected in parallel through conductor 92 to a balancing potentiometer 94 driven by the motor 50. One resistive branch of the potentiometer 94 is connected by the conductor 96 to the electromagnetic coil 98 associated with the core section 100 of the balancing relay device to complete a circuit through the resistor 102 when current is conducted between the electrodes of the probe elements 44 respectively connected to the conductors 104 and 106. The conductor 104 is therefore connected to the resistor 102 while the conductor 106 is connected to the power line 62 through the conductor 60. The other branch of the balancing potentiometer 94 is connected by the conductor 108 to the electromagnetic coil 110 associated with the core section 112 of the balancing relay device, the electromagnetic coil 110 being connected directly to the conductor 104 so that an energizing circuit may be completed when current is being conducted between the electrodes.

From the foregoing description of the electrical control circuit, it will be apparent that parallel energizing circuits will be established through the electromagnetic coils 98 and 100 of the balancing relay 78 so that with the balancing potentiometer 94 at a suitable position, the movable contactor 88 of the balancing relay will be in a neutral position out of contact with either the fixed contact 80 or the fixed contact 86. The motor energizing circuits will therefore be open. When, however, the level of the liquid within which the sensing probe is immersed, varies from its preset level the energizing current for the electromagnet relays 98 and 100 will be unbalanced causing the movable contactor 88 to move into contact with the contact 80 or 86 depending upon the direction of the unbalance or whether the liquid level has risen or fallen. When the contactor 88 engages one of the fixed contacts, an energizing circuit will be established through one of the coils 52 or 54 of the motor in order to cause energization of the motor in one direction. At the same time, electromagnetic coils 76 or 84 will be energized in order to hold the movable contactor 88 in engagement with its fixed contact. The motor will therefore displace the valve crank of the choke valve in one direction or the other in order to vary the discharge rate of flow. At the same time, the balancing potentiometer 94 will be repositioned in order to change the relative resistance of the branches. Accordingly, simultaneous movement of the balancing potentiometer will tend to re-establish the balanced energizing current condition for the balancing relay. When balance has been restored, the balancing relay will then cause the movable contactor 88 to move to its neutral position opening the energizing circuit to the motor so as to cause the energization thereof. The choke valve will thereby be moved to a new position necessary to maintain the liquid level despite variation in the inflow of liquid to the well or source. In view of the intermittent energization and de-energization of the motor 50, arc suppression means is provided in the form of series connected resistor 112 and capacitor 114 connected between the conductors 92 and 66. Also, in order to limit the travel of the motor output in either direction, the limit swich assembly 74 is provided so that either switch 72 or 82 is opened in order to open the energizing circuit to the motor and prevent overtravel of the valve crank 24 for the choke valve assembly 22.

From the foregoing description, the construction, operation and utility of the control system for the pumping system of the present invention will be apparent. Although the pump control system is described in connection with an irrigation well, it will be appreciated that it will be equally useful in connection with other installations such as boilers and other liquid containers wherein iti s desirable to maintain a predetermined level therein. The system of the present invention provides therefore, facilities for modulating the outflow of liquid continuously withdrawn from a source in accordance with inflow of liquid thereto and accomplishes this end by sensitive regulation of the outflow in proportion to the variation in the liquid level. Variations in liquid level are therefore instantaneously dispatched as command signals to a servo-system operating on a null-voltage principle employing the balancing relay device 78 for directional control of the choke positioning motor in accordance with the command signals received. Also associated with the servo-system is a balancing potentiometer 94 whereby the change in position of the servo-system is continuously monitored in order to render the balancing relay device operative to deenergize the motor and hold the choke valve in a new position corresponding to the change in the inflow rate of liquid to the source.

The foregoing is considered as illustrative only of the principles of the invention. Further, since numerous modifications and changes will readily occur to those skilled in the art, it is not desired to limit the invention to the exact construction and operation shown and decribed and accordingly all suitable modifications and equivalents may be resorted to, falling within the scope of the invention as claimed.

What is claimed as new is as follows:

1. In combination with a source of liquid having an unknown and variable liquid inflow rate and a pumping mechanism for withdrawing liquid from said source, a choke valve for controlling the discharge flow rate of liquid from said pumping mechanism and means operatively connected to said choke valve for modulating said discharge flow rate in proportion to said variable liquid inflow rate comprising, reversible motor means for controlling the position of said choke valve, sensing probe means fixedly mounted immersed in said liquid to a predetermined depth, signal means operatively connecting said sensing probe means to the motor means for displacement of the choke valve in response to variation in the liquid level to correspondingly vary the discharge flow rate, and position control means responsive to restoration of the liquid level at which the sensing probe means is immersed said predetermined depth for stopping the motor means at a position of the choke valve to maintain said liquid level constant, said sensing probe means comprising a pair of parallel electrodes, and elongated spacer mounting said electrodes and a tubular shield enclosing said electrodes having an open bottom disposed below the level of liquid and vent holes above the liquid level, said signal means comprising a balancing relay device operatively connected to the motor means for energization thereof in response to a change in the conductivity of the liquid in contact with said electrodes at said predetermined depth, and limiting means for de-energizing the motor means upon displacement beyond a preset amount, said position control means comprising a balancing potentiometer driven by the motor means to a position rendering the balancing relay device operative to deenergize the motor means.

2. In combination with a source of liquid having an unknown and variable liquid inflow rate and a continuously operating pumping mechanism for withdrawing liquid from said source, a choke valve for controlling the discharge flow rate of liquid from said pumping mechanism, and means operatively connected to said choke valve for modulating said discharge flow rate in proportion to said variable liquid inflow rate comprising, reversible motor means for controlling the position of said choke valve to vary the flow rate of liquid therethrough, electrode means fixedly mounted immersed in said liquid at a predetermined level, signal means operatively connecting said electrode means to the motor means for displacement of the choke valve in response to a change in the liquid level to correspondingly vary the discharge flow rate, and position control means responsive to restoration of said predetermined liquid level for stopping the motor means at a position of the choke valve to maintain said predetermined liquid level, said signal means comprising a balancing relay device operatively connected to the motor means for energization thereof in response to a change in the conductivity of the liquid in contact with said electrode means at said predetermined level and limiting means for deenergizing the motor means upon displacement beyond a present amount, said position control means comprising a balancing potentiometer driven by the motor means to a position rendering the balancing relay device operative to deenergize the motor means.

3. In combination with a source of fluid having an unknown and variable inflow rate and a continuously operating pumping mechanism for withdrawing fluid from said source, a choke valve for controlling the discharge flow rate of fluid from said pump mechanism and means operatively connected to said choke valve for modulating said discharge flow rate in proportion to said variable inflow rate comprising, reversible motor means for controlling the position of said choke valve to vary the flow rate of fluid therethrough, sensing probe means fixedly mounted immersed in said fluid, signal means operatively connecting said sensing probe means to the motor means for displacement of the choke valve in response to a change in the quantity of fluid within which the probe means is immersed to correspondingly vary the discharge flow rate, and position control means responsive to restoration of a predetermined quantity of fluid within which the sensing probe means is immersed for stopping the motor means at a position of the choke valve to maintain said quantity of fluid constant, said sensing probe means comprising a pair of parallel electrodes, an elongated spacer mounting said electrodes and a tubular shield enclosing said electrodes having an open bottom disposed within the fluid and vent holes exposed to atmosphere, said signal means comprising a balancing relay device operatively connected to the motor means for energization thereof in response to a change in the conductivity of the fluid in contact with said electrodes, and limiting means for deenergizing the motor means upon displacement thereof beyond a preset amount, said position control means comprising a balancing potentiometer driven by the motor means to a position rendering the balancing relay device operative to deenergize the motor means.

References Cited by the Examiner

UNITED STATES PATENTS

| | | | |
|---|---|---|---|
| 1,813,747 | 7/1931 | Kirgan | 103—97 |
| 2,059,635 | 11/1936 | Fillo | 137—392 |
| 2,240,607 | 5/1941 | Buck | 103—40 |
| 2,297,680 | 10/1942 | Alling | 103—25 |
| 2,303,716 | 12/1942 | Arndt | 103—25 |
| 2,412,723 | 12/1946 | Elliott | 103—241 |
| 2,425,607 | 8/1947 | Edwards et al. | 230—11 |
| 2,675,020 | 5/1954 | Breitwieser | 103—11 |
| 2,925,784 | 2/1960 | Jennings | 103—11 |
| 3,012,510 | 12/1961 | Kusner | 103—40 |

FOREIGN PATENTS 48,680   2/1938   France.

MARK NEWMAN, *Primary Examiner.*

DONLEY J. STOCKING, SAMUEL LEVINE,
*Examiners.*

W. L. FREEH, *Assistant Examiner.*